United States Patent
Walrath

(10) Patent No.: US 7,507,464 B2
(45) Date of Patent: Mar. 24, 2009

(54) EXTRUDED VARIEGATED PLASTIC SIDING PANELS

(75) Inventor: George A. Walrath, Newark, OH (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 10/611,767

(22) Filed: Jul. 1, 2003

(65) Prior Publication Data

US 2005/0003221 A1   Jan. 6, 2005

(51) Int. Cl.
    *B32B 5/16* (2006.01)
(52) U.S. Cl. .................. 428/203; 428/327; 428/402; 428/522; 264/173.18
(58) Field of Classification Search ............... 428/203, 428/327, 402, 522; 264/173.18
    See application file for complete search history.

(56) References Cited

U.S. PATENT DOCUMENTS

| | | | |
|---|---|---|---|
| 3,770,470 A | 11/1973 | Swank | |
| 4,183,777 A | 1/1980 | Summers et al. | |
| 4,290,248 A | 9/1981 | Kemerer et al. | |
| 4,356,216 A | 10/1982 | Gailey et al. | |
| 4,356,217 A | 10/1982 | Wollam et al. | |
| 4,411,215 A | 10/1983 | Gailey et al. | |
| 4,411,218 A | 10/1983 | Wollam et al. | |
| 4,619,957 A | 10/1986 | Reid et al. | |
| 4,624,710 A | 11/1986 | Modly | |
| 5,030,676 A | 7/1991 | Wallen | |
| 5,053,176 A | 10/1991 | Cameron et al. | |
| 5,126,088 A | 6/1992 | Andres | |
| 5,185,191 A | 2/1993 | Silbermann et al. | |
| 5,232,751 A | 8/1993 | Cameron et al. | |
| 5,387,381 A | 2/1995 | Saloom | |
| 5,670,244 A | 9/1997 | Taylor et al. | |
| 5,866,054 A | 2/1999 | Dorchester et al. | |
| 5,866,639 A | 2/1999 | Dorchester et al. | |
| 5,869,176 A * | 2/1999 | Dorchester et al. | 428/327 |
| 5,998,006 A | 12/1999 | Bambara et al. | |
| 6,823,794 B2 * | 11/2004 | Bosler et al. | 101/488 |
| 2001/0045680 A1 * | 11/2001 | Blasius et al. | 264/75 |
| 2002/0094398 A1 * | 7/2002 | Gockel et al. | 428/35.7 |
| 2003/0021915 A1 * | 1/2003 | Rohatgi et al. | 428/15 |
| 2004/0232581 A1 * | 11/2004 | Hills | 264/75 |
| 2005/0003221 A1 * | 1/2005 | Walrath | 428/522 |

FOREIGN PATENT DOCUMENTS

| | | |
|---|---|---|
| WO | WO 97/04019 | 2/1997 |
| WO | WO 98/52996 | 11/1998 |

* cited by examiner

*Primary Examiner*—Leszek Kiliman
(74) *Attorney, Agent, or Firm*—Duane Morris LLP

(57) ABSTRACT

A variegated polymeric article such as a variegated siding panel having improved depth of color and a three-dimensional appearance is formed having a substantially clear, methacrylic acid based capstock coextruded to a tinted polyvinyl chloride based substrate material. A specially formulated streaker pellet provides accent color streaks within the capstock to simulate a wood grain appearance. The use of a clear capstock material eliminates the need for capstock tinting necessary in the prior art to color match the capstock to the substrate material in post formed variegated vinyl sidings. Titanium dioxide may also be introduced in small amounts to the capstock to provide further ultraviolet light protection to the underlying tinted polyvinyl chloride based substrate material.

25 Claims, 1 Drawing Sheet

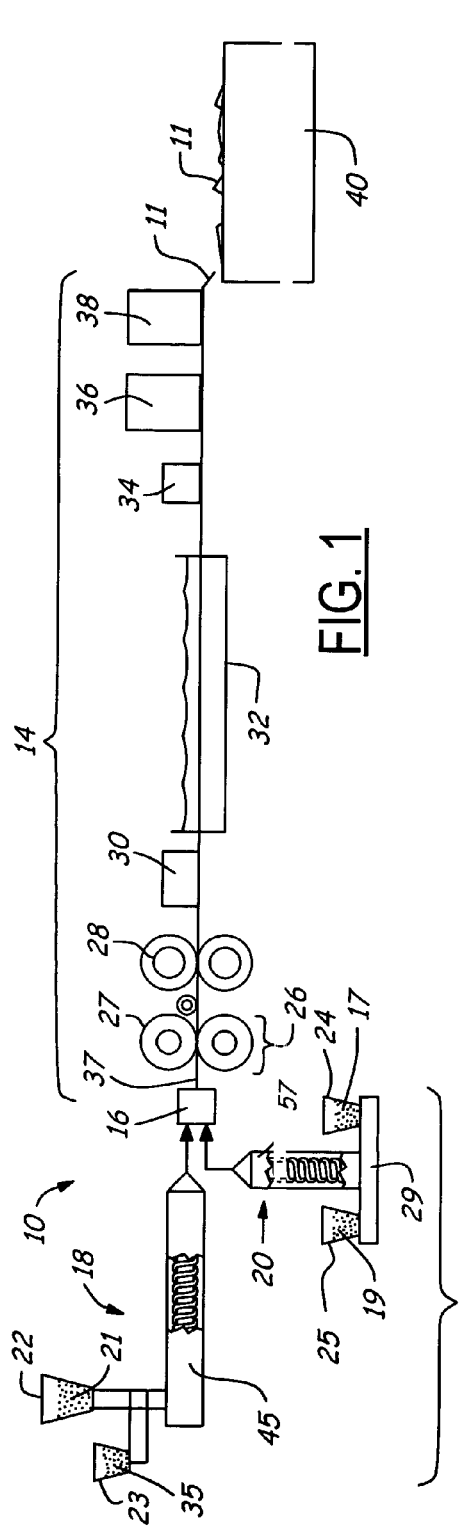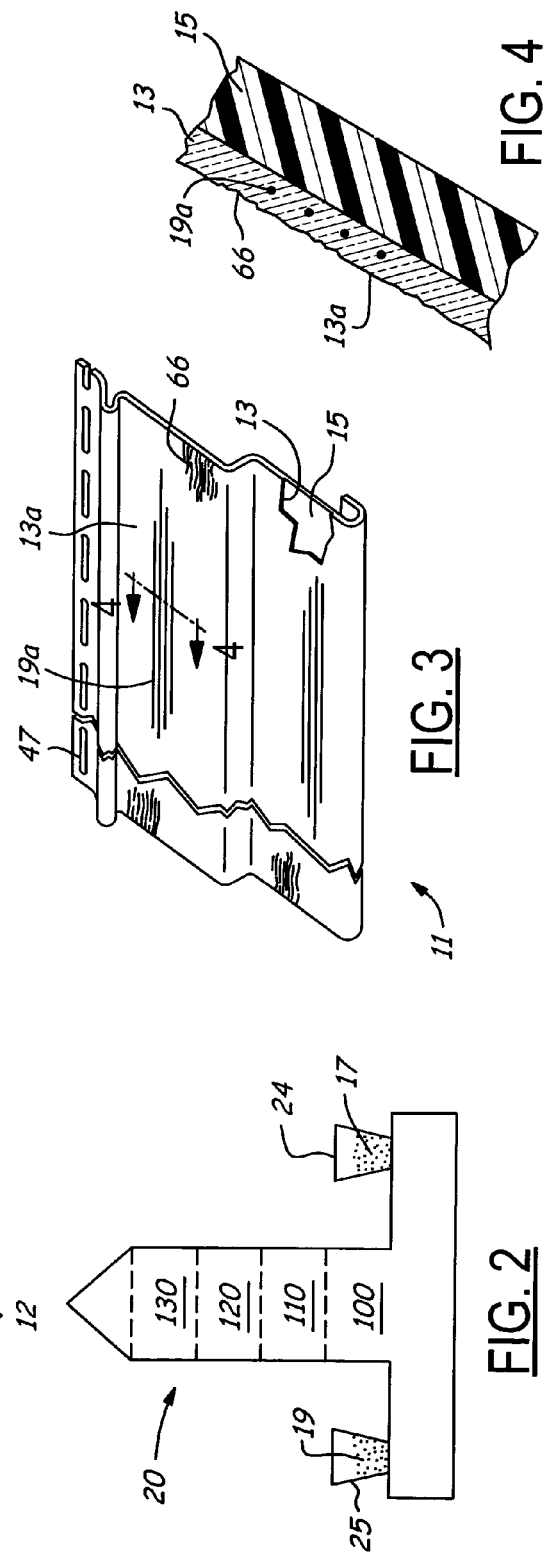

EXTRUDED VARIEGATED PLASTIC SIDING PANELS

TECHNICAL FIELD AND INDUSTRIAL APPLICABILITY OF THE INVENTION

This invention relates to the manufacture of plastic articles with an accent color pattern. The present invention relates particularly to an extrudable plastic material, such as variegated siding, having improved color and three-dimensional appearance.

BACKGROUND OF THE INVENTION

Vinyl siding panels are widely used for protecting the exterior walls of buildings, as well as for enhancing the exterior appearance of buildings. The siding panels may have different profiles and exterior finishes, to provide variety in the exterior appearance they can provide to a building. Typically, the siding panels are nailed or otherwise secured to the building to fix them in place.

Formerly, in constructing vinyl siding panels, it was customary to extrude a sheet of vinyl with the entire profile formed therein, and to then cut the sheet of vinyl into panels of appropriate lengths. The sheet utilized conventional color concentrators designed to give it a desired coloration properties. The sheets could also be embossed or otherwise formed to add ornamentation to more closely simulate natural wood siding products.

In recent years the vinyl siding industry has switched to "post formed" vinyl siding, in which the siding is extruded as a flat sheet and then formed into the desired shape in post forming operations.

The industry has also switched from solid vinyl siding panels to co-extruded panels having a base substrate and an outer layer (commonly called a "capcoat" or "capstock" layer. The substrate layer is hidden from view when the siding is applied to a building, and is typically formed of conventional, relatively inexpensive but sturdy polyvinyl chloride (also known as rigid PVC). The substrate typically utilizes conventional color concentrators designed to give it a desired coloration properties. The outer layer forms the exposed, outer component of the vinyl product. The known capstock typically is formed of the same composition as the substrate (including the color concentrators), and often includes a material that forms accent color streaks in the formed capstock layer. This is described in U.S. Pat. Nos. 5,387,381, 5,866,054, 5,866,639, and 5,869,176 which are incorporated herein by reference in their entirety. The methods and products described in the these patents can produce variegated siding panels having a natural, wood grain-like appearance, but which do not provide for adequate weathering properties nor an adequate depth of color. Specifically, these teach a capstock that includes a background color and accent color streaks, and the substrate therefore does not significantly contribute to the apparent color of the panel, so as to limit the depth and appearance of the color.

PVC siding panels typically include titanium dioxide as an UV inhibitor. Titanium dioxide has a dual function in polyvinyl chloride articles such as variegated vinyl siding. Titanium dioxide stabilizes the polyvinyl chloride used in the substrate and capstock against the adverse effects of ultraviolet ("U.V.") radiation by absorbing, reflecting, dispersing or scattering the incident U.V. energy, and also provides a white coloration of the panel since titanium dioxide is a white pigment which makes the material at least opaque and prevents it from being translucent. Titanium dioxide is the brightest white pigment with the highest opacity of any commercial product.

Unfortunately, the amount of titanium dioxide necessary for effective U.V. stabilization, about 3 parts per hundred parts of base polymeric material, precludes dark coloration of the variegated vinyl articles. Typically, only colored articles of pastel shades can be obtained; deep shades of brown, blue and maroon, for example, are not readily attainable.

Another problem that commonly occurs in variegated vinyl sidings is edge visibility. When observing a variegated siding panel from its side (i.e. along the edge of the panel), coloration differences between the capcoat layer and underlying substrate are readily apparent. These coloration differences are mainly due to the presence of the accent color streaks within the capcoat layer. Substantial costs, in terms of scrap (either during the startup or changeover of lines) may accrue in determining the proper formulation of capcoat tinting that is needed in order to match the capcoat color to the underlying substrate when observing the variegated panel along an edge.

It is thus highly desirable to produce a U.V. stable variegated siding panel that is capable of achieving dark (or "deep") coloration. It is also highly desirable to reduce or eliminate the need for capcoat tinting to eliminate edge visibility problems. It is also desirable that such a panel be produced using conventional extrusion line equipment.

SUMMARY OF THE INVENTION

The present invention addresses the above-mentioned problems by providing an ultraviolet light resistant variegated plastic article such as a variegated siding panel that has deep coloration properties (i.e. dark coloration, and coloration in three dimensions). Also, the present invention can provide a variegated plastic article having a three-dimensional grain effect by placing accent color streaks in a clear capcoat layer on the colored substrate.

Further, since the capcoat is made from another material which has natural ultraviolet protection, titanium dioxide is not utilized in the capcoat. This eliminates the need for capcoat tinting to address edge visibility concerns and reduces startup and changeover scrap associated with capcoat tinting procedures. The present invention is preferably formed on conventional variegated siding extrusion lines without the need for special equipment.

To form the variegated plastic article of the present invention, a substantially clear methacrylic acid-based capcoat layer, or capstock, and a colored, polyvinyl chloride based substrate layer are formed in separate extruders. The formed capstock and colored substrate layer are coextruded together to form a variegated plastic article having deep coloration, ultraviolet light resistance, and a three-dimensional wood grain appearance.

To form the capstock layer, color streaker pellets are introduced with a compatible methacrylic acid-based polymeric capstock into an extruder. The extruder can be programmed with a staggered temperature profile designed to melt the methacrylic acid-based polymeric capstock to a viscous state while only slowly softening and dispersing the streaker pellets. By this process, the resinous component of the streaker pellets tends to encapsulate the weatherable pigment material so that the pigment material does not disperse into the viscous polymeric capstock material.

To form the colored substrate, the polyvinyl chloride material and color feeder pellets are heated to soften (i.e., melt) and mix into a homogeneous viscous state to form the colored substrate.

In a coextrusion die, the viscous colored substrate and the viscous capstock are co-extruded together to form a web material. Accent color streaks produced from the encapsulated weatherable pigment material tend to stretch, and do not disperse to any significant degree further, in the web material. The web material may be subsequently processed to form the variegated polymeric article, and more particularly a variegated siding panel, having the dimensional and surface ornamentation desired.

In an alternative embodiment, a small percentage of titanium dioxide may still be introduced into the clear capcoat layer to provide additional ultraviolet light stabilization of the underlying substrate layer without adversely affecting the improved deep coloration properties of the colored substrate layer.

In another alternative embodiment, a plastic article may be provided having a tinted substrate (polyvinyl chloride based or otherwise) and an U.V. resistant clear capcoat without accent color streaks.

Other features, benefits and advantages of the present invention will become apparent from the following description of the invention, when viewed in accordance with the attached drawings and appended claims.

BRIEF DESCRIPTION OF THE DRAWINGS

FIG. 1 is a schematic diagram for making a variegated siding panel according to one preferred embodiment of the present invention;

FIG. 2 is a close-up view of one of the screw extruders of FIG. 1;

FIG. 3 is a perspective and partial cutout view of the variegated panel according to a preferred embodiment of the present invention that may be formed in accordance with the method of FIG. 1; and FIG. 4 is a section view of a portion of FIG. 3.

DETAILED DESCRIPTION AND PREFERRED EMBODIMENTS OF THE INVENTION

FIG. 1 illustrates a system 10 for producing a variegated polymeric article, here shown as a siding panel 11, according to a preferred embodiment of the present invention. The system 10 includes an extrusion section 12 in which substrate material and capstock material are coextruded into a substantially flat web 37, and a post-forming section 14 in which the web 37, while in a hot, semi-viscous state, is formed into a siding profile and set in position. The substrate may be almost any known polymeric material, and in a preferred embodiment comprises a polyvinyl chloride based substrate formulation, or in an alternative embodiment comprises an ABS material, other polymeric materials, a natural fiber (eg cellulistic), or combination of these or other known substrate materials. The capstock preferably comprises a methacrylic acid capstock, as described in further detail below, or alternatively may comprise other known substantially clear materials useful in such an application.

The extrusion section 12 includes a coextrusion die 16 and a pair of screw extruders 18, 20 for feeding material, under predetermined heat and pressure conditions, into the coextrusion die 16. The extruders 18, 20 are preferably twin-screw extruders with each of the respective screws rotating in opposite directions, however any type of extruder may be used, as is appreciated by those of ordinary skill in the art. Each extruder 18, 20 has a respective main feed chamber 22, 24 designed to mix and feed material at a desired feed rate.

In the manufacture of variegated siding 11, it is known to extrude two layers through the coextrusion die 16 to form an extrusion comprising two layers of material bonded together. The base layer of the material is known as the substrate 15. The substrate 15 can be formed of a conventional, relatively inexpensive, but sturdy vinyl material 21 (e.g., a polyvinylchloride material known as rigid PVC) and a conventional color concentrator homogenous mixed to form a colored layer. The other or outer layer, commonly referred to in the art as "capstock" 13, forms part of the exposed, outer component of the product when the variegated panel 11 is applied to a building. The capstock 13, in the preferred embodiment of the present invention, is a substantially clear layer of resinous material 17 having a special accent color producing streaks 19a, as discussed further hereinafter. A variegated siding panel 11 formed as described above is shown in FIGS. 3 and 4 and includes embossing 66 to give a further wood grain effect.

The term "substantially clear" layer, for the purposes of the present invention, describes a film-like layer through which the coloration of the underlying substrate 15 may be readily observed, that is, the underlying substrate color contributes to the apparent color of the final product including the substrate covered with the substantially clear layer. This contrasts to typical siding products which provide substantially all of the visible color of the product within the capstock, such that the substrate provides no significant contribution to the visible color.

The substrate material 21, preferably includes polyvinyl chloride in powdered form, which is mixed in the feed chamber 22 and then introduced into the screw extruder 18. Color feed pellets 35 are preferably introduced into a second feed chamber 23 coupled to the extruder 18 at a feed rate designed to provide the desired substrate 15 coloration. As one of ordinary skill appreciates, the color feed pellets 35 may contain a wide variety of organic and inorganic pigments that are compatible with the polyvinyl chloride powder that are commonly used by those of ordinary skill in the art in the siding industry to produce panels having a desired color.

In the barrel 45 of the screw extruder 18, the substrate material 21 and color feeder pellets 35 are heated by heating element(s) to an "extrudable consistency". Such an "extrudable consistency" for the purposes of this disclosure includes softening (i.e., melting acrylic or getting PVC to a fusible form) and mixing the material into a homogeneous viscous state to form the substrate 15 before the substrate 15 is introduced into the extrusion die 16.

A powdered or pelletized polymeric capstock resin 17 contained within a feed chamber 24 is introduced into the screw extruder 20. A streaker compound 19, in the form of pellets, is added to the capstock resin 17 within the extruder 20 from a separate feed chamber 25. In the barrel 57 of the extruder 20, the capstock resin 17 and pelletized streaker 19 are heated by heating elements to soften the capstock resin 17 into a viscous state before the capstock 13 is introduced into the coextrusion die 16. Moreover, in the extruder 20, the streaker pellets 19, due to their controlled heat deflection characteristics, soften and disperse into the resin in a restricted fashion to introduce accent color streaks or patterns into the viscous capstock. A more detailed explanation of the process for forming the capstock 13 is described below with respect to FIG. 2.

The substrate 15 and the capstock 13 are introduced together into the coextrusion die 16.

In the coextrusion die 16, the viscous substrate 15 and the viscous capstock 13 (including the accent color streaks 19a produced by the pellets 19) are extruded together into an extruded web 37 material.

In the post-forming section 14, the extruded web 37 material, while in a hot semi-viscous state, is formed into a variegated siding panel 11. The post-forming section 14 includes an embosser 26, cooling rolls 28, one or more calibrators 30 (here shown as one calibrator), or forming tool(s) 30, a cooling trough 32, a perforator 34, a puller 36, and a cutter 38.

The embosser 26 is located immediately downstream of the coextrusion die 16. The embosser 26 is designed to emboss a desired surface configuration (shown as 66 on FIG. 4) or ornamentation onto the capstock side (shown as 13a of FIG. 3) of the web 37. Typically, embossed surfaces may be formed, for example, to simulate wood grain appearances. Further, the rolls 27 of the embosser 26 apply tension to the web 37 to neck the web 37 down to a particular dimension.

The cooling rollers 28 are located immediately downstream of the embosser 26. In the cooling rollers 28, the web 37, while still in a hot, semi-viscous state is cooled to allow for forming in the calibrator 30.

After leaving the cooling rollers 28, the web 37 is directed through the calibrator 30. In the calibrator 30, the web 37 is formed into its final shape (here a siding profile). Vacuum drawing means are provided in the calibrator 30, to draw the variegated siding material against the walls of the calibrator and into its permanent final siding 11 shape. Water or air sprays (not shown) may also used to assist in the cooling.

After leaving the calibrator 30, the siding material is drawn through the cooling trough 32, typically a water bath. In the cooling trough 32, final lock, or dimensional control of the variegated siding panel 11 profile, is affected. If a water bath is utilized, it is preferably maintained at a temperature of about 90 degrees-100 degrees Fahrenheit that helps set the siding into its predetermined, final profile.

Finally, downstream of the cooling trough 32, the variegated siding panel 11 may be further processed using a perforator 34, a puller 36, and a cutter 38. The perforator 34 introduces holes 47 at predetermined locations in the panels 11 that are used to attach the panels to buildings using nails or other fasteners (not shown). The puller 36 is used to ensure that the length and width of the formed panels is within the desired range. The cutter 38 cuts the panels to a desired length and width.

The variegated siding panel 11 may then be stored for shipment on a packing table 40 or similar storage container well known to those of ordinary skill in the art. The foregoing post-forming features of a plastic siding extrusion system are known to those in the art, and should require no further discussion.

In the system of FIG. 1, the capstock 13 is formed by a dry mix of powder-sized particles including a powdered capstock resin material or a pre-blended pellet containing capstock resin material 17 and a plurality of streaker pellets 19. The powdered or pelletized capstock 17 material is mixed in the feed chamber 24 and is fed into the throat 29 of the extruder 20. The streaker pellets 19, for introducing accent color streaks 19a within the capstock 13, are incorporated with the capstock resin 17 in the extruder 20 from a second feed chamber 25.

Preferably, the capstock resin 17 is a methacrylic acid-based resin material that has a heat deflection temperature and glass transition temperature similar to the polyvinyl chloride based substrate material 21 (between approximately 165 and 220 degrees Fahrenheit) and forms a clear surface when extruded. Further, the capstock resin 17 should be compatible with the polyvinyl chloride material substrate material 21. One preferred capstock resin 17 that meets these requirements is the impact modified poly methyl methacrylate, Acryligard CS-103, available from Rohm and Haas Company of Philadelphia, Pa. Another preferred clear methacrylic acid resin 17 is TufCoat 4840, available from Lucite Corporation of Cordova, Tenn. Other impact modified poly methyl methacrylates can also be used.

If additional UV protection is desired, even though this is not necessary in accordance with the broad aspects of the invention, the methacrylic acid based capstock resins 17 could also contain a small percentage of titanium dioxide. The $TiO_2$ helps to block and scatter ultraviolet rays that can discolor or otherwise degrade the polyvinyl chloride based substrate 15. Two preferred methacrylic acid-based resins 17 having titanium dioxide include the impact modified poly methyl methacrylates, Acryligard CS-104, available from Rohm and Haas, and TufCoat 5000, available from Lucite Corporation. Other impact modified poly methyl methacrylates can also be used.

While the introduction of titanium dioxide to the capstock layer 13 may help to scatter ultraviolet light, and thereby improve the degradation resistance of the variegated siding panel 11, there are potential drawbacks to the use of titanium dioxide in the clear capstock 13. As described above, the titanium dioxide is a white pigment, therein adding opacity to the capstock layer. Depending upon the amount of titanium dioxide added, edge visibility (the degree of color matching of the substrate 15 and capstock 13 along the edge of the formed panel 11) of the panel 11 may be adversely affected. To remedy this edge visibility, color tints (not shown) may be added to the capstock 13 in order to color match the capstock 13 to the underlying substrate 15.

The streaker pellets 19 are pelletized color concentrates composed of blended weatherable pigments in an organic carrier resin. The organic carrier resin is compatible with the methacrylic acid based capstock resin 17 but has a higher melting point than that of the capstock resin 17. One preferred streaker pellet 19 is referred to as "Variegated Color Concentrates", and is commercially available from Americhem, Inc. of Cuyahoga Falls, Ohio. The pellets can have any size and shape, but preferably are approximately one-eighth inch in diameter and about one-quarter inch in length. Preferably the weatherable pigment comprises an inorganic pigment. For the purposes of this disclosure, "weatherable" is meant to include a product which does not change more than four (4) color units while being tested under ASTM D3679.

Referring now to FIG. 2, a close-up view of the extruder 20 is shown. In accordance with a preferred embodiment of the invention, four distinct zones 100, 110, 120, 130 are provided in the barrel of the extrude and used to mix the methacrylic acid-based resin 17 (with or without titanium dioxide) and streaker pellets 19. The temperature within the zones 100, 110, 120, 130 is maintained in a staggered profile to ensure that there is no premature "bleedout" of the inorganic pigments contained in the streaker pellets 19.

The first zone 100 and second zone 110 are maintained at a temperature and are designed to slowly warm the streaker pellets 19 below their softening point. At the same time, the capstock resin 17 is fully melted into viscous form. It is understood to those of ordinary skill that the first zone 100 and second zone 110 may be combined into one single zone having a temperature profile designed to slowly warm the streaker pellets 19 below their softening point while the capstock resin 17 is fully melted into a viscous form. One skilled in the art further appreciates that there may be additional zones prior to the first heating zones, but for the purposes of this description, the described zones relate to those important in heating the capstock material and the streaker pellets within the current invention.

The temperature of the third zone 120 is maintained at a temperature at or slightly below the melting point of the resinous component of the streaker pellet 19. The fourth zone 130 is maintained at a temperature slightly above the melting point of the resinous component of the streaker pellet 19. Furthermore, the fourth zone preferably includes only a small portion of the system, such that the resinous compound melts at, or immediately before, the die. Accordingly, the pigment remains encapsulated until the last moment, and therefore does not disperse to impart a deep color to the entire capcoat. Additionally, the temperature may be achieved by compression forces in or adjacent to the die, so that the pigment is released as described above.

In a preferred embodiment of the present invention, wherein the methacrylic based capstock resin 17 and "Variegated Color Concentrator" streaker pellets 19 are utilized, the first zone 100 and second zone 110 are preferably maintained between approximately 290 and 340 degrees Fahrenheit, while the third zone is maintained between approximately 310 and 360 degrees Fahrenheit. Further, the fourth zone is maintained at between approximately 325 and 380 degrees Fahrenheit, which corresponds to a temperature slightly greater than the melting point of the resinous component of the "Variegated Color Concentrator" streaker pellets 19.

As the capstock resin 17 material and the streaker pellets 19 are heated in the fourth zone 130, the resinous component of the streaker pellets 19 tends to encapsulate the inorganic pigment material so that it does not disperse well into the viscous capstock resin 17 material. When subsequently extruded through the coextrusion die 16, the accent color pellets 19 tend to stretch, and do not disperse to any significant degree in the extruded panel 11. This forms accent color streaks 19a that simulate wood grain on the surface of the panel 11. Further, because the accent color streaks 19a are located in the clear capstock layer 13, while the underlying vinyl substrate material 15 is colorized (tinted), a three-dimensional effect is created within the variegated siding panel 11.

The present invention offers many advantages over prior art variegated vinyl siding panels that utilize titanium dioxide in the polyvinyl chloride based capstock and substrate layers. For example, the present invention produces variegated siding panels having deep coloration without an accompanying loss in ultraviolet light protection properties. Thus, deep shades of brown, blue and maroon, for example, are readily attainable when utilizing the present invention by providing a clear capstock layer coupled onto a colored substrate.

Also, the present invention provides a controllable two-dimensional streaked effect in the variegated siding panel 11 by placing the accent color streaks 19a in a substantially clear capstock layer 13 extruded on a colored substrate 15. To control the release of the streaking pigments in the capstock resin 17, specially formulated streaker pellets 19, in conjunction with a staggered temperature extruder profile, are utilized.

Further, by placing the accent color streaks 19a in the acrylic capcoat layer 13 above a colored substrate layer 15, a variegated siding panel 11 may be produced with a three-dimensional wood grain effect that more closely simulates natural wood grain sidings.

Further, by eliminating the need for titanium dioxide in the capcoat layer 15, edge visibility concerns are minimized or eliminated. There is no need to color match a substantially clear capstock layer to a colored substrate. Therefore, manufacturing cost savings associated with eliminating the additional tinting operation may be realized. Further, costs associated with startup and changeover scrap that results from incorrect tinting may also be minimized or eliminated.

Finally, because the present invention may be formed on conventional variegated siding extrusion lines without the need for special equipment, no additional costs are realized in changing over to this technology of the present invention.

Alternatively, in another preferred embodiment in which a small percentage of titanium dioxide is introduced to the resinous material forming the capstock layer, additional ultraviolet light protection properties to the underlying substrate layer may be realized (a small percentage being less than about 12 parts per hundred). In this alternative preferred embodiment, the deep coloration properties of the panel 11 are not greatly affected because the underlying substrate layer 15 is not muted by the titanium dioxide pigmentation.

In a further alternative embodiment, another form of a cap, such as a film, may be produced according to the present invention. The cap may then be applied to a substrate in a known manner to engage the layers, such as by using an adhesive, pressure, or by laminating the cap to the substrate in a heated state.

The present invention is useful with conventional vinyl siding. However, one skilled in the art appreciates the concepts taught herein are useful with other forms, and using other substrates. For example, fencing, decking, and railing are currently manufactured from a number of materials, such as vinyl extrusion. The principles taught herein may be used in a like manner for these similarly-made products. Additionally, other products are made using a capped foamed and/or fiber filled substrate, such as wood or fiber-filled decking, or capped wood, steel, aluminum or foam products. Likewise, other composite polymer articles could be manufactured according to the present invention.

While the invention has been described in terms of preferred embodiments, it will be understood, of course, that the invention is not limited thereto since modifications may be made by those skilled in the art, particularly in light of the foregoing teachings. For example, a coextruded siding panel made according to the present invention could be produced wherein the clear capstock layer does not have accent color streaks. Further, a siding panel could be made in with a non-PVC based tinted substrate layer and the clear capstock layer (with and without accent color streaks). Also, the present invention may be used to form a wide variety of variegated and non-variegated plastic articles other than siding panels.

What is claimed is:

1. A variegated polymeric article, comprising:
   an underlying tinted substrate covered by a capstock, wherein the capstock comprises a plurality of color streaks and a substantially clear capstock layer through which coloration of the underlying tinted substrate is observed to provide a three-dimensional effect of the color streaks above the underlying tinted substrate and in the substantially clear capstock layer.

2. The variegated polymeric article of claim 1 wherein said substrate comprises tinted polyvinyl chloride.

3. The variegated polymeric article of claim 1 wherein said substantially clear capstock layer is substantially untinted.

4. The variegated polymeric article of claim 1 wherein said substantially clear capstock layer comprises a methacrylic acid based resin that is substantially free of ultraviolet resistant material.

5. The variegated polymeric article of claim 1 wherein said substantially clear capstock layer comprises impact modified poly methyl methacrylate resin that is substantially free of ultraviolet resistant material.

6. The variegated polymeric article of claim 1, wherein said substantially clear capstock layer comprises a substantially clear polymer, and said color streaks are formed by weatherable pigment in an organic carrier resin.

7. The variegated polymeric article of claim 1, comprising:
an embossed surface simulating wood grain on the capstock layer.

8. The variegated polymeric article of claim 1 wherein the variegated polymeric article is shaped with a siding profile to comprise a variegated siding panel.

9. The variegated polymeric article of claim 1 wherein the variegated polymeric article is shaped with a siding profile and an embossed surface simulating wood grain on the capstock layer to comprise a variegated siding panel, and
the variegated siding panel is provided with holes at predetermined locations for fasteners to attach the panel to a building.

10. The variegated polymeric article of claim 1, wherein the substantially clear capstock layer includes an ultraviolet resistant material of less than about twelve parts per hundred in a substantially clear polymer.

11. The variegated polymeric article of claim 10, wherein the ultraviolet resistant material comprises titanium dioxide, and the substantially clear polymer comprises a methacrylic acid based resin.

12. The variegated polymeric article of claim 10, wherein the ultraviolet resistant material comprises titanium dioxide, and the substantially clear polymer comprises impact modified poly methyl methacrylate.

13. The variegated polymeric article of claim 10 wherein said substrate comprises tinted polyvinyl chloride.

14. The variegated polymeric article of claim 10, wherein the substantially clear capstock layer comprises a substantially clear polymer, and said color streaks are formed by weatherable pigment in an organic carrier resin.

15. The variegated polymeric article of claim 10, comprising:
an embossed surface configuration simulating wood grain on the capstock layer.

16. The variegated polymeric article of claim 10 wherein the variegated polymeric article is shaped with a siding profile to comprise a variegated siding panel.

17. The variegated polymeric article of claim 10 wherein the variegated polymeric article is shaped with a siding profile and an embossed surface configuration simulating wood grain on the capstock layer to comprise a variegated siding panel, and
the variegated siding panel is provided with holes at predetermined locations for fasteners to attach the panel to a building.

18. A method of manufacturing the variegated polymeric article of claim 1, comprising:
melting a tinted substrate material to provide a viscous substrate material, and extruding the viscous substrate material to form the underlying tinted substrate;
mixing pellets comprising weatherable pigment in an organic carrier resin with a substantially clear capstock material, while melting the substantially clear capstock material to provide a viscous capstock material;
mixing the viscous capstock material and the pellets prior to melting the organic carrier resin of the pellets;
mixing the viscous capstock material and the pellets while melting the organic carrier resin of the pellets to provide the weatherable pigment in a viscous organic carrier resin;
extruding the viscous capstock material together with the weatherable pigment in the viscous organic carrier resin to provide the capstock; and
laminating the capstock and the underlying tinted substrate to provide the substantially clear capstock layer through which coloration of the underlying tinted substrate is observed to provide the three-dimensional effect of the color streaks above the underlying tinted substrate and in the substantially clear capstock layer.

19. The method of claim 18 wherein laminating the capstock and the underlying tinted substrate comprises coextruding the capstock and the underlying tinted substrate.

20. The method of claim 18, comprising:
embossing a surface configuration simulating wood grain on the capstock layer.

21. The method of claim 18, comprising:
shaping the variegated polymeric article with a siding profile to comprise a variegated siding panel.

22. The method of claim 18, comprising:
embossing a surface configuration simulating wood grain on the capstock layer;
shaping the variegated polymeric article with a siding profile to comprise a variegated siding panel; and
providing the variegated siding panel with holes at predetermined locations for fasteners to attach the panel to a building.

23. The method of claim 18 wherein;
said melting a tinted substrate material to provide a viscous substrate material, and said extruding the viscous substrate material to form the underlying tinted substrate is performed in a first extruder;
said mixing pellets comprising weatherable pigment in an organic carrier resin with a substantially clear capstock material, while melting the substantially clear capstock material to provide a viscous capstock material is performed at a first temperature in a zone of a second extruder or in two zones of the second extruder;
said mixing the viscous capstock material and the pellets prior to melting the organic carrier resin of the pellets is performed at a second temperature in another zone of the second extruder;
said mixing the viscous capstock material and the pellets while melting the organic carrier resin of the pellets to provide the weatherable pigment in a viscous organic carrier resin is performed at a third temperature in a further zone of the second extruder; and
said laminating the capstock and the tinted substrate comprises coextruding the capstock and the tinted substrate in a third extruder.

24. The method of claim 18 wherein;
said mixing pellets comprising weatherable pigment in an organic carrier resin with a substantially clear capstock material, while melting the substantially clear capstock material to provide a viscous capstock material is performed at a first temperature below a softening point temperature of the organic carrier resin;
said mixing the viscous capstock material and the pellets prior to melting the organic carrier resin of the pellets is performed at a second temperature substantially at or slightly below the melting point of the organic carrier resin; and
said mixing the viscous capstock material and the pellets while melting the organic carrier resin of the pellets to provide the weatherable pigment in a viscous organic carrier resin is performed at a third temperature.

25. The method of claim 24 wherein;

said melting a tinted substrate material to provide a viscous substrate material, and extruding the viscous substrate material to form the underlying tinted substrate is performed in a first extruder;

said mixing pellets comprising weatherable pigment in an organic carrier resin with a substantially clear capstock material, while melting the substantially clear capstock material to provide a viscous capstock material is performed at the first temperature in a zone of a second extruder or in two zones of the second extruder;

said mixing the viscous capstock material and the pellets prior to melting the organic carrier resin of the pellets is performed at the second temperature in another zone of the second extruder; and said mixing the viscous capstock material and the pellets while melting the organic carrier resin of the pellets to provide the weatherable pigment in a viscous organic carrier resin is performed at the third temperature in a further zone of the second extruder.

* * * * *